United States Patent
Chu et al.

(10) Patent No.: US 12,388,087 B2
(45) Date of Patent: Aug. 12, 2025

(54) COMPOSITE ANODE, AND LITHIUM SECONDARY BATTERY COMPRISING THE SAME

(71) Applicant: Samsung SDI Co., Ltd., Yongin-si (KR)

(72) Inventors: Heeyoung Chu, Yongin-si (KR); Doori Oh, Yongin-si (KR); Yungu Cho, Yongin-si (KR); Hyun Soh, Yongin-si (KR); Yoonyoung Choi, Yongin-si (KR); Ickkyu Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 820 days.

(21) Appl. No.: 17/596,927

(22) PCT Filed: Jun. 18, 2020

(86) PCT No.: PCT/KR2020/007915
§ 371 (c)(1),
(2) Date: Dec. 21, 2021

(87) PCT Pub. No.: WO2020/256440
PCT Pub. Date: Dec. 24, 2020

(65) Prior Publication Data
US 2022/0320509 A1    Oct. 6, 2022

(30) Foreign Application Priority Data
Jun. 21, 2019  (KR) .................... 10-2019-0074121

(51) Int. Cl.
*H01M 4/583* (2010.01)
*H01M 4/38* (2006.01)
(Continued)

(52) U.S. Cl.
CPC ............ *H01M 4/583* (2013.01); *H01M 4/386* (2013.01); *H01M 4/625* (2013.01); *H01M 10/0525* (2013.01)

(58) Field of Classification Search
None
See application file for complete search history.

(56) References Cited

U.S. PATENT DOCUMENTS

| 6,589,696 B2 | 7/2003 | Matsubara et al. |
| 10,217,991 B2 | 2/2019 | Hwang et al. |

(Continued)

FOREIGN PATENT DOCUMENTS

| CN | 105895873 A | 8/2016 | |
| CN | 107369823 A | * 11/2017 | .............. H01M 4/04 |

(Continued)

OTHER PUBLICATIONS

CN 107369823A translation (Year: 2017).*
International Search Report dated Sep. 23, 2020, for International application No. PCT/KR2020/007915, 2 pages.

*Primary Examiner* — Helen Oi K Conley
*Assistant Examiner* — Amanda Rosenbaum
(74) *Attorney, Agent, or Firm* — Womble Bond Dickinson (US) LLP

(57) ABSTRACT

A composite anode and a secondary battery including the same are disclosed. The composite anode includes a silicon-containing structure; a first carbon material; a second carbon material; and a conductive material, wherein the first carbon material has a specific surface area (BET) value of 1.5 m²/g or less, a rate of change of the specific surface area (m²/g) to an increase in particle size (μm) is −0.07 to −0.04 m²/μm·g, and an area occupied by pores in a cross-section of the first carbon material is 10% or less.

13 Claims, 5 Drawing Sheets

(51) Int. Cl.
*H01M 4/62* (2006.01)
*H01M 10/0525* (2010.01)

(56) References Cited

U.S. PATENT DOCUMENTS

| | | |
|---|---|---|
| 10,340,518 B2 | 7/2019 | Cho et al. |
| 10,622,624 B2 | 4/2020 | Son et al. |
| 10,622,631 B2 | 4/2020 | Jo et al. |
| 10,974,965 B2 | 4/2021 | Moon et al. |
| 2012/0251888 A1 | 10/2012 | Yamomoto et al. |
| 2013/0130115 A1 | 5/2013 | Park et al. |
| 2013/0252110 A1 | 9/2013 | Park et al. |
| 2015/0162644 A1* | 6/2015 | Fujii .............. H01M 10/052 429/199 |
| 2016/0359162 A1 | 12/2016 | Kim et al. |
| 2018/0083272 A1* | 3/2018 | Son ................ H10N 10/855 |
| 2018/0145316 A1* | 5/2018 | Moon .............. H01M 4/134 |
| 2018/0190975 A1* | 7/2018 | Ishii ............. H01M 10/0525 |
| 2020/0006759 A1* | 1/2020 | Ay ................ H01G 11/38 |

FOREIGN PATENT DOCUMENTS

| | | |
|---|---|---|
| KR | 10-0453896 B1 | 10/2004 |
| KR | 10-2012-0022826 A | 3/2012 |
| KR | 10-2013-0056668 A | 5/2013 |
| KR | 10-2013-0106687 A | 9/2013 |
| KR | 10-2014-0085822 A | 7/2014 |
| KR | 10-1491092 B1 | 2/2015 |
| KR | 10-2015-0138812 A | 12/2015 |
| KR | 10-2016-0147672 A | 12/2016 |
| KR | 10-1761004 B1 | 7/2017 |
| KR | 10-2018-0031566 A | 3/2018 |
| KR | 10-2018-0031585 A | 3/2018 |
| KR | 10-2018-0036456 A | 4/2018 |
| KR | 10-2018-0056395 A | 5/2018 |
| KR | 10-2019-0091411 A | 8/2019 |

* cited by examiner

COMPOSITE ANODE, AND LITHIUM SECONDARY BATTERY COMPRISING THE SAME

CROSS-REFERENCE TO RELATED APPLICATION(S)

This application is a U.S. National Phase Patent Application of International Application Number PCT/KR2020/007915, filed on Jun. 18, 2020, which claims priority of Korean Patent Application Number 10-2019-0074121, filed on Jun. 21, 2019, the entire content of each of which is incorporated herein by reference.

TECHNICAL FIELD

The present disclosure relates to a composite anode and a lithium secondary, battery including the same.

BACKGROUND ART

Lithium secondary batteries are used as power sources for driving portable electronic appliances such as video cameras, mobile phones, and notebook computers. Rechargeable lithium secondary batteries have three times higher energy density per unit weight than known lead batteries, nickel-cadmium batteries, nickel metal hydride batteries, and nickel-zinc batteries, and may be charged at high speed.

A lithium secondary battery produces electrical energy by oxidation and reduction reactions occurring when lithium ions are intercalated/desorbed in a state of charging an electrolyte between a cathode and an anode including active materials capable of intercalating and desorbing lithium ions.

Recently, there has been considerable requirements for high-energy-density batteries suitable for large electronic appliances, such as electric vehicles, requiring high power. There are attempts to use silicon particles having a high discharge capacity as an anode active material in order to realize batteries having high energy density, but an anode deteriorates due to a large volume change of the silicon particles during charging and discharging, thereby reducing lifespan characteristics.

In order to suppress the volume expansion of silicon particles, attempts have been made to mix silicon particles and carbon materials and use them in the form of a composite. Specifically, a silicon-carbon composite includes graphite for imparting conductivity to silicon particles and a carbon layer for suppressing volume expansion, as carbon materials. However, as the content of silicon particles increases, a larger amount of carbon material and binder must be added to relieve stress caused by volume change and impart conductivity, and as a result, problems of deterioration of battery characteristics such as a decrease in energy density per weight and an increase in internal resistance occur. Therefore, the silicon-carbon composite has a limitation in that it is difficult to include silicon particles in a content of a certain level or more, and there is still a need for the development of batteries having high energy density sufficient to be applied to large electronic appliances such as electric vehicles.

DESCRIPTION OF EMBODIMENTS

Technical Problem

An aspect is to provide a composite anode and a secondary battery including the same, the composite anode including a silicon-containing structure; a first carbon material; a second carbon material; and a conductive material, wherein the first carbon material has a specific surface area (BET) value of 1.5 m$^2$/g or less, a rate of change of the specific surface area (m$^2$/g) to an increase in particle size (μm) is −0.07 to −0.04 m$^2$/μm·g, and an area occupied by pores in a cross-section of the first carbon material is 10% or less Another aspect is to provide a lithium secondary battery including the composite anode, a cathode, and an electrolyte.

Solution to Problem

According to an aspect, there is provided a composite anode including:
  a silicon-containing structure,
  a first carbon material,
  a second carbon material, and
  a conductive material,
wherein
  the first carbon material has a specific surface area (BET) value of 1.5 m$^2$/g or less, a rate of change of the specific surface area (m$^2$/g) to an increase in particle size (μm) is −0.07 to −0.04 m$^2$/μm·g, and an area occupied by pores in a cross-section of the first carbon material is 10% or less.
According to another aspect,
there is provided a lithium secondary battery including the composite anode, a cathode, and an electrolyte.

Advantageous Effects of Disclosure

In the composite anode according to an aspect, high capacity can be accomplished by using a high-capacity silicon-containing composite in which the content of silicon is increased by replacing graphite with silicon in the composition of a conventional silicon-carbon composite, contactability can be improved by including a first carbon material which has a specific surface area (BET) value of 1.5 m$^2$/g, a decrease in conductivity due to a decrease in graphite fraction and which a rate of change of the specific surface area (m$^2$/g) to an increase in particle size (μm) is −0.07 to −0.04 m$^2$/μm·g and an area occupied by pores in a cross-section of the first carbon material is 10% or less, thereby improving conductivity, long lifespan characteristics can be exhibited by including a second carbon material, and energy density can be improved by decreasing the content of a conductive material according to the introduction of the first carbon material, thereby obtaining the capacity increase, long lifespan characteristics and high energy density of a lithium secondary battery.

EXPLANATION OF REFERENCE NUMERALS DESIGNATING THE MAJOR ELEMENTS OF THE DRAWINGS

Figure 1:
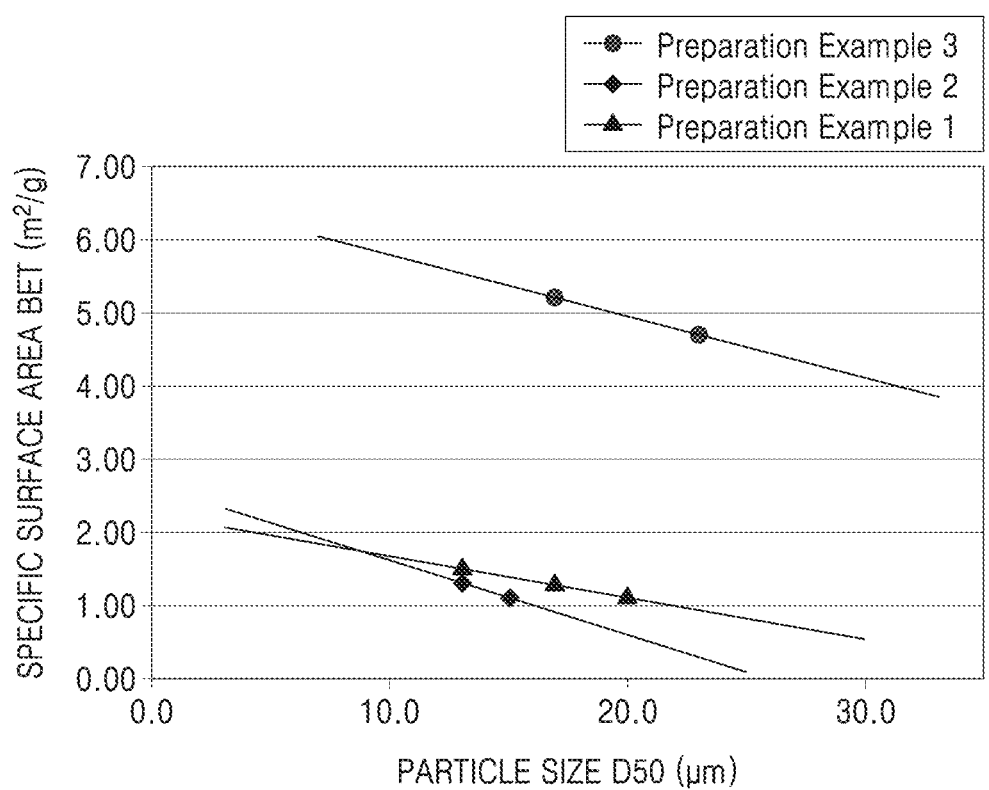
FIG. 1 is a trend line graph showing the rate of change of specific surface area with respect to the rate of change of particle size of carbon materials of Preparation Examples 1 to 3.
Figure 2:
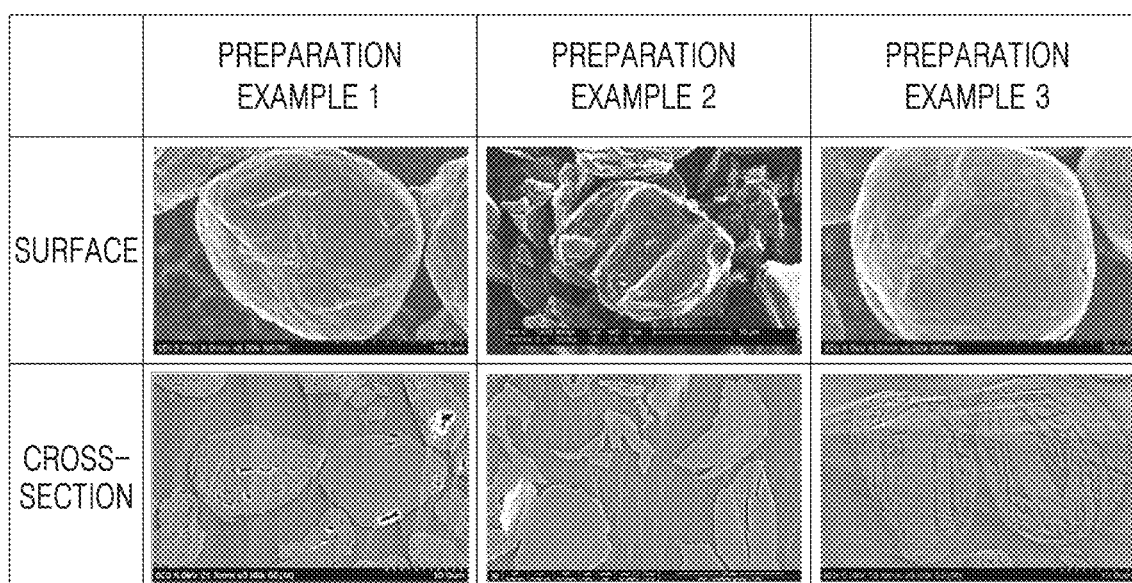
FIG. 2 shows SEM images of surfaces and cross-sections of the carbon materials prepared in Preparation Examples 1 to 3.

1: Lithium battery
2: Anode
3: Cathode
4: Separator
5: Battery case
6: Cap assembly

MODE OF DISCLOSURE

The present inventive concept described below can apply various transformations and can have various embodiments, and specific embodiments are illustrated in the drawings and described in detail in the detailed description. However, the present inventive concept may be embodied in many different forms, should not be construed as being limited to the embodiments set forth herein, and should be construed as including all modifications, equivalents, and alternatives within the scope of the present inventive concept.

The terms used herein is for the purpose of describing particular embodiments only and is not intended to be limiting of the inventive concept. Singular expressions include plural expressions unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the diameters, lengths, and thicknesses are enlarged or reduced in order to clearly express various layers and regions. Throughout the specification, the same reference numerals are attached to similar parts Throughout the specification, when an element such as a layer, a film, a region or a component is referred to as being "on" another layer or element, it can be "directly on" the other layer or element, or intervening layers, regions, or components may also be present. Throughout the specification, the fact that A and B are arranged to be in "directly contact" means that the surface of A and the surface of B are arranged in contact with each other, and there is no other part at the interface between A and B. Throughout the specification, the terms such as first, second, etc. may be used to describe various components, but the components should not be limited by the terms. These terms are used only to distinguish one component from another, not for purposes of limitation. Some of the components may be omitted in the drawings, but this is for helping the understanding of features of the invention and is not intended to exclude the omitted components.

Among commercially available anodes, the most usable anode is a graphite-based anode. An anode using graphite as an active material has good cycle characteristics, but has limitations in terms of high rate and capacity. Recently, in terms of capacity increase, research on constructing an anode by substituting a part of graphite among anode materials with silicon has been actively conducted. Although silicon has high capacity, there is a disadvantage that a volume change is severe during charging and discharging. Therefore, in a silicon-based anode, as charging and discharging cycles proceed, cracks in the anode are caused by the volume change of silicon. Cracks in the anode lead to deterioration of the anode due to deterioration of conductivity and desorption of an active material due to penetration of an electrolyte.

In order to solve the above problems, a graphite-containing silicon-carbon composite obtained by mixing silicon and graphite was developed, and the decrease in conductivity caused by the volume change of silicon was compensated by the addition of graphite to improve lifespan characteristics.

Meanwhile, high-capacity secondary batteries are required according to the integration of electronic devices and the development of electric vehicles, and the development of secondary batteries having a higher capacity than the existing ones is still required.

In this regard, it may be considered to increase the fraction of silicon in an anode, but this method has a limitation in that an active material deteriorates due to the occurrence of cracks in the anode. When the fraction of silicon is increased as in the conventional method, a problem of a decrease in conductivity caused by deterioration due to volume expansion occurs, and the addition of a conductive material to compensate for the decrease in conductivity results in an increase in the total weight of the anode, so that energy density per weight decreases. In addition, due to the increased amount of the conductive material, a larger amount of binder is required, which causes an increase in resistance in the anode, and thus there is a limitation in that rate characteristics are deteriorated. Thus, an anode suitable for high capacity has not been proposed yet.

Thus, the present inventors have found that in the case of mixing a first carbon material and a second carbon material having excellent contactability with a graphite-free silicon-containing composite in a conventional graphite-containing silicon-carbon composite to form anode, it is possible to manufacture an anode having both capacity increase and long lifespan characteristics without loss of conductivity.

That is, the graphite-free silicon-containing composite has high capacity in that it can contain more silicon as much as the amount of graphite in the existing graphite-containing silicon-carbon composite, and the decrease in conductivity due to the absence of graphite is compensated for by the first carbon material having excellent contactability, so that the composite anode having this configuration can have high capacity and long life characteristics.

Hereinafter, a composite anode according to embodiments, and a lithium secondary battery including the composite anode will be described in more detail.

The composite anode according to an embodiment includes a silicon-containing structure; a first carbon material; a second carbon material; and a conductive material, wherein the first carbon material has a specific surface area (BET) value of 1.5 $m^2/g$ or less, a rate of change of the specific surface area ($m^2/g$) to an increase in particle size (μm) is −0.07 to −0.04 $m^2/μm·g$, and an area occupied by pores in a cross-section of the first carbon material is 10% or less.

Hereinafter, the silicon-containing structure, the first carbon material, the second carbon material, and the conductive material will be described in detail.

The first carbon material has a specific surface area (BET) value of 1.5 $m^2/g$ or less, and has physical properties in which the interplanar distance d002 of (002) plane is 3.356 Å to 3.357 Å as measured by XRD, and the rate of change of specific surface area (m²/g) to the rate of change of particle size (μm) is −0.07 to −0.04 m²/μm·g. The specific surface area of the first carbon material has a value similar to the specific surface area of artificial graphite, and the interplanar distance d002 and packing density values are similar to those of natural graphite. Accordingly, since the first carbon material has a structure similar to that of artificial graphite and natural graphite, the first carbon material has both long lifespan characteristics obtained by the specific surface area value of artificial graphite and high conductivity characteristics due to excellent contactability obtained by the interplanar distance d002 value and packing density value of natural graphite.

The first carbon material has a interplanar distance d002 of (002) plane of 3.356 Å to 3.357 Å as measured by XRD. Considering that the d002 value of natural graphite is 3.356 Å to 3.357 Å, it can be found that the first carbon material exhibits structural similarity to natural graphite.

The first carbon material has a specific surface area (BET) value of 1.5 m²/g or less, for example, 1.4 m²/g or less or 1.3 m²/g or less. In the case of natural graphite, it generally has a specific surface area of more than 4.0 m²/g, so that deterioration due to contact over a wide area with an electrolyte in an electrode is significant. However, the first carbon material generally has a very low specific surface area value like artificial graphite having a specific surface area of about 1.3 m²/g, so that the reaction area with an electrolyte is small, and deterioration due to a side reaction with the electrolyte can be prevented. Accordingly, the first carbon material may impart longer lifespan characteristics compared to the case of using natural graphite.

The first carbon material has a rate of change of specific surface area (m²/g) to a rate of change of particle size (μm) of −0.07 to −0.04 m²/μm·g, for example −0.06 to −0.04 m²/μm·g, −0.07 to −0.05 m²/μmg or −0.05 to −0.04 m²/μm·g. Referring to FIG. 1, in the case of natural graphite, the rate of change of specific surface area to the rate of change of particle size is about −0.08 m²/μm·g, and in the case of artificial graphite, the rate of change of specific surface area to the rate of change of particle size is about −0.10 m²/μm·g. That is, the first carbon material has a lower decrease rate in specific surface area according to particle size compared to natural graphite and artificial graphite. This is because the particle shape of the first carbon material is round and the inside thereof is dense, so when the particle size decreases, the increase in specific surface area due to internal pores is small.

The first carbon material has a packing density of 1.7 g/cc or more. As used herein, the term "packing density" refers to a density of a specific material per unit volume in the case of packing the specific material under pressure in a specific container at a pressure of 2.0 t/cm³. High packing density means that packing is advantageous in an active material layer, and contact with other materials in the active material layer is improved.

The first carbon material may have a tap density of about 1.10 g/cc to about 1.15 g/cc. The term "tap density" herein may be measured based on ASTM D4781, and may be calculated using Equation TD=W/V (TD: tap density, W: sample weight (g), V: sample volume after tapping).

The packing density of artificial graphite is about 1.58 g/cc, and the packing density of natural graphite is about 2.13 g/cc. Meanwhile, it may be found that the first carbon material has a packing density of about 1.7 g/cc or more and 2.1 g/cc or less, so the first carbon material has a contact ability superior to that of artificial graphite and similar to that of natural graphite.

That is, as the first carbon material has a packing density similar to that of natural graphite, it may have high conductivity due to excellent contactability, and as the first carbon material has a low specific surface area like artificial graphite, side reactions with an electrolyte may be suppressed. Therefore, the first carbon material can have excellent high-rate characteristics due to high contactability and conductivity, and can have long lifespan characteristics due to low specific surface area.

The area occupied by the pores in the cross-section of the first carbon material is 10% or less. Although will be described later, the area occupied by the pores in the cross-section of the first carbon material is smaller than that of general natural graphite, and is similar to that of artificial graphite. Accordingly, the degradation of the first carbon material due to side reactions is suppressed during the impregnation with the electrolyte compared to natural graphite, and the first carbon material has significantly superior cycle characteristics compared to natural graphite.

The first carbon material may be densely filled with a carbon material therein by spheroidizing natural flake-shaped graphite in the presence of a pitch circle. The process of spheroidizing natural flake-shaped graphite may be performed through a method such as isotropic compression. The densified graphite filled inside is subjected to a graphitization process through high-temperature heat treatment of 3000° C. or higher, and has characteristics of high efficiency and long lifespan.

The second carbon material is a material obtained by sintering soft carbon such as pitch at high temperature and high pressure, and has the following physical properties. For example, the second carbon material includes artificial graphite.

The second carbon material has an average particle diameter (D50) of about 1 μm to about 15 μm, for example, about 5 μm to about 15 μm, for example, about 10 μm to about 15 μm.

The second carbon material has a tap density of about 1.15 g/cc to about 1.20 g c, for example, about 1.16 g/cc to about 1.19 g/cc. The second carbon material has a packing density of about 1.4 g/cc to about 1.7 g/cc, for example, about 1.4 g/cc to about 1.6 g/cc.

The second carbon material has a specific surface area (BET) of about 1.2 m²/g to about 1.4 m²/g, for example, about 1.3 m²/g. The second carbon material has a specific surface area similar to that of artificial graphite, thereby providing long lifespan characteristics to an electrode.

The d002 value of the second carbon material is about 3.359 Å to about 3.356 Å, for example about 3.3591 Å to about 3.3599 Å.

The rate of change of specific surface area (m²/g) to the rate of change of particle size (μm) of the second carbon material is −0.08 to −0.12 m²/μmg. For example, the rate of change of specific surface area to the rate of change of particle size may be −0.09 to −0.12 m²/μmg, −0.09 to −0.11 m²/μm·g, or −0.1 m²/μm·g.

The packing density of the first carbon material is greater than the packing density of the second carbon material. Accordingly, the first carbon material may be distributed between the silicon-containing structure and the second carbon material in the electrode, and contactability between these materials may be increased, so that the conductivity of the electrode is improved.

The rate of change of specific surface area (m²/g) to the rate of change of particle size (μm) of the first carbon material is smaller than the rate of change of specific surface area (m²/g) to the rate of change of particle size (μm) of the second carbon material. This is because the volume of pores in the first carbon material is smaller than the volume of pores in the second carbon material. In other words, the pores in the first carbon material are filled with a carbon material such as pitch, so that the volume of the pores is relatively small, and with the result that deterioration due to side reactions is suppressed during impregnation with an electrolyte, and thus the second carbon material may have long lifespan characteristics.

The content of the first carbon material may be the same as or different from the content of the second carbon material. According to one embodiment, the content of the first carbon material may be higher than the content of the second carbon material. Through this, it is possible not only to compensate for the reduced conductivity due to the absence of graphite in the silicon-containing structure, but also to reduce the content of the conductive material. In addition, since the silicon-containing structure may be further included by the reduced amount of the conductive material, high capacity can be achieved.

The conductive material may include at least one of graphite particles, acetylene black, carbon black, and Ketjen black, but within the range of not deteriorating the capacity and battery characteristics of the composite anode, any conductive material may be used as long as it is used in the art.

According to an embodiment, the silicon-containing structure may be graphite-free.

Specifically, the silicon-containing structure may include a silicon-containing composite including porous silicon secondary particles; and a carbon-based coating film disposed on the silicon-containing composite and including first amorphous carbon, wherein the silicon-containing composite includes second amorphous carbon such that density of the silicon-containing composite is equal to or lower than density of the carbon-based coating film, the porous silicon secondary particle includes an aggregate of two or more silicon composite primary particles, and the silicon composite primary particle includes silicon; and silicon suboxide (SiOx) (0<x<2) on at least one surface of the silicon and a first carbon flake on at least one surface of the silicon suboxide and includes a second carbon flake on at least one surface of the porous silicon secondary particles.

The silicon suboxide exists in a state of a film, a matrix, or a combination thereof, and the first carbon flake and the second carbon flake exist in at least one state selected from a film, a particle, and a matrix, respectively.

The first carbon flake and the second carbon flake may be identical to each other.

As used herein, the term "silicon suboxide" may have a single composition represented by SiOx (0<x<2). Alternatively, the silicon suboxide may refer to a case in which an average composition including at least one selected from Si and $SiO_2$ is represented by SiOx (0<x<2). And the silicon suboxide may represent or include, for example, $SiO_2$.

"Silicon suboxide" may also be defined to include a silicon-suboxide-like material. The silicon suboxide-like material is a material having characteristics similar to those of silicon suboxide, and may refer to, for example, a case in which an average composition including at least one selected from Si and $SiO_2$ is represented by SiOx (0<x<2).

The density of the silicon-containing composite and the density of the carbon-based coating film may be evaluated by measuring the porosity of the silicon-containing composite and the porosity of the carbon-based coating film, respectively. The density of the silicon-containing composite may be equal to or lower than the density of the carbon-based coating film. The silicon-containing composite may have a porosity of 60% or less, for example 30% to 60%, or may have a non-porous structure. In the present specification, the non-porous structure refers to a case in which the porosity is 10% or less, for example, 5% or less, for example, 0.01% to 5% or 0%. Porosity was measured according to a Hg porosimetry.

Porosity and density are inversely proportional to each other. For example, the porosity of the carbon-based coating film is lower than the porosity of a porous silicon composite cluster, so it may be said that the porosity of the carbon-based coating film is higher than the density of the porous silicon composite cluster.

Figure 5:
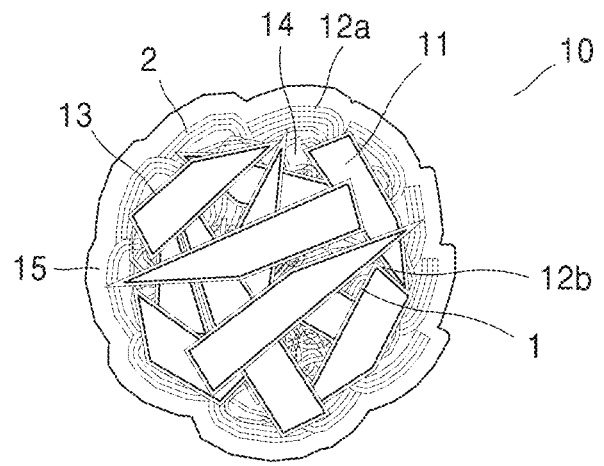
FIG. 5 schematically shows the structure of a silicon-containing structure according to an embodiment.
Figure 6:
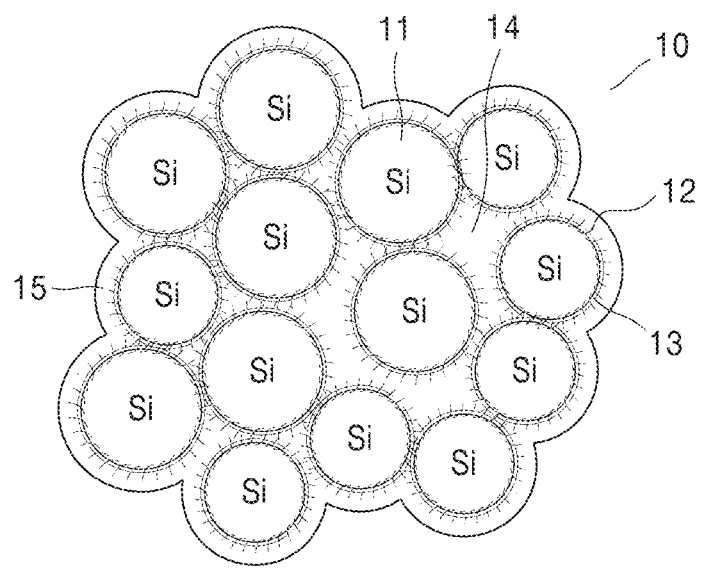
FIG. 6 schematically shows the structure of a silicon-containing structure according to another embodiment.

FIG. 5 shows the structure of a silicon-containing structure when the first carbon silicon has plate-like and needle-like shapes, and FIG. 6 shows the structure of a silicon-containing structure when silicon is a spherical particle and a first carbon flake and a second carbon flake are the same as each other.

Referring to FIG. 5, the silicon-containing structure 10 includes a porous silicon secondary particle containing an aggregate of two or more silicon composite primary particles. The silicon composite primary particle includes silicon (11), a silicon suboxide 13 (SiOx) (0<x<2) on at least one surface of the silicon 11, and a first carbon flake 12a on at least one surface of the silicon suboxide 13, includes a second carbon flake 12b on at least one surface of the silicon composite secondary particle, and has a structure in which a carbon-based coating film 15 containing amorphous carbon is disposed on the second carbon flake 12b. The carbon of the first carbon flake and the second carbon flake has a relatively low density compared to the amorphous carbon of the carbon-based coating film. The carbon of the first carbon flake and the second carbon flake is present on the surface of the silicon to effectively buffer the volume change of the silicon, and the carbon of the carbon-based coating film formed outside a cluster improves the physical stability of a cluster structure and effectively suppresses the side reactions between the silicon and the electrolyte during charging and discharging.

The first carbon flake 12a and the second carbon flake 12b are the same as each other. The silicon-containing structure 10 includes a silicon-containing composite and a carbon-based coating film 15 containing amorphous carbon, and the interior or pores of the silicon-containing composite contain amorphous carbon 14. The carbon-based coating film 15 contains high-density amorphous carbon.

In the silicon-containing composite 10, as shown in FIG. 6, the silicon 11 has a spherical particle shape different from that of FIG. 5. In the silicon-containing composite of FIG. 6, the first carbon flake 12a and the second carbon flake 12b of FIG. 5 are graphene flakes 12, and the interior or pores of the silicon-containing composite contains amorphous carbon 14.

The density of the inside of the silicon-containing composite is equal to or lower than that of the carbon-based coating film 15 disposed thereon. Here, the density may be evaluated by measuring porosity and the like.

In FIGS. 5 and 6, the amorphous carbon 14 contained in the silicon-containing composite exists between the silicon composite primary particles and/or the silicon composite secondary particles. The silicon composite primary particle contains silicon 11, silicon suboxide 13 (SiOx) (0<x<2) on at least one surface of the silicon 11 and a first carbon flake 12a on at least one surface of the silicon suboxide 13.

The silicon-containing structure of FIGS. 5 and 6 is a dense structure having a non-porous structure in which pores therein are filled with dense amorphous carbon as described above. When the silicon-containing structure has such a constructure, when the charging and discharging of a lithium battery employing this silicon-containing structure as an anode active material, side reactions to the electrolyte are reduced, and the volume change of silicon is effectively buffered, so the expansion rate due to physical volume expansion is small, and the mechanical properties of the cluster structure are maintained. In addition, even when an electrolyte containing an organic solvent such as fluoroethylene carbonate is used, battery performance such as lifespan characteristics and high-rate characteristics is excellent.

As used herein, silicon suboxide refers to silicon suboxide (SiOx) (0<x<2).

In the silicon composite primary particle, silicon suboxide (SiOx) (0<x<2) may be disposed to cover at least one surface of silicon. The first carbon flakes of the silicon suboxide may be disposed to cover at least one surface of the silicon suboxide.

The second carbon flake of the porous silicon secondary particle may be disposed to cover at least one surface of the porous silicon secondary particle.

The first carbon flake may be disposed directly on the silicon suboxide, and the second carbon flake may be disposed directly on the porous silicon secondary particle. In addition, the first carbon flake may fully or partially cover the surface of the silicon suboxide. For example, the coverage rate of the silicon suboxide is 10% to 100%, for example 10% to 99%, for example 20% to 95%, for example 40% to 90%, based on the total surface area of the silicon suboxide. The second carbon flake may be directly grown on the silicon suboxide of the porous silicon secondary particle.

The first carbon flake is grown directly from the surface of the silicon suboxide and disposed directly on the surface of the silicon suboxide. In addition, the second carbon flak is directly grown from the surface of the porous silicon secondary particle and disposed directly on the surface of the porous silicon secondary particle.

In addition, the second carbon flake may fully or partially cover the surface of the porous silicon secondary particle. For example, the coverage rate of the second carbon flake is 5% to 100%, for example 10% to 99%, for example 20% to 95%, for example 40% to 90%, based on the total surface area of the porous silicon secondary particle.

The silicon-containing structure according to an embodiment includes a silicon-containing composite in a core of the structure and a second carbon flake in a shell disposed on the core of the structure. When the volume expansion of the silicon-containing structure occurs, carbon is disposed in a flake shape in the shell, so that silicon and carbon easily contact each other. In addition, since pores exist in the core of the structure, the pores may be utilized as a buffer space during expansion, and a carbon-based coating film containing high-density amorphous carbon as a cell may be provided to suppress penetration of the electrolyte. And, the shell can inhibit the physical pressing of the core of the structure. In addition, the carbon-based coating film contains amorphous carbon as described above, so lithium movement is advantageous during charging and discharging. The carbon-based coating film may fully or partially cover the surface area of the silicon-containing composite. The coverage rate of the carbon-based coating film is, for example, 5% to 100%, for example 10% to 99%, for example 20% to 95%, for example 40% to 90%, based on the total surface area of the silicon-containing composite.

The silicon-containing structure according to an embodiment may have a non-spherical shape, and its sphericity is, for example, 0.9 or less, for example, 0.7 to 0.9, for example, 0.8 to 0.9, for example, 0.85 to 0.9.

In the present specification, the sphericity is determined by Equation 1 below, where A is an area and P is a boundary line.

[Equation]
Image

As the first carbon flake and the second carbon flake, any carbon-based material having a flake shape may be used. Examples of the carbon-based material include graphene, graphite, carbon fiber, graphitic carbon, and graphene oxide.

In the porous composite silicon cluster according to an embodiment, the first graphene and the second graphene may be contained instead of the first carbon flake and the second carbon flake. Here, the first graphene and the second graphene may have a structure such as a nanosheet, a film, a graphene nanosheet, or a flake. The term "nanosheet" refers to a case of being formed om the silicon suboxide or the porous silicon secondary particle in an irregular state to a thickness of about 1000 nm or less, for example, 1 nm to 1,000 nm, and the "film" refers to a film continuously and uniformly formed on the silicon suboxide or the porous silicon secondary particle.

In the carbon-based coating film, the amorphous carbon is at least one selected from the group consisting of pitch carbon, soft carbon, hard carbon, mesophase pitch carbide, calcined coke, and carbon fiber.

The carbon-based coating layer may further include crystalline carbon. When the crystalline carbon is further contained as described above, a buffering role for volume expansion of the silicon-containing composite can be smoothly performed.

The crystalline carbon is at least one selected from the group consisting of natural graphite, artificial graphite, graphene, fullerene, and carbon nanotubes.

In the porous silicon composite duster, a mixing ratio of the total flake carbon of the first carbon flake and the second carbon flake and the coating carbon of the carbon-based coating film is 30:1 to 1:3 by weight, for example, 20:1 to 1:1 by weight, specifically 10:1 to 1:0.9 by weight. Total flake carbon refers to the sum of the first and second carbon flakes. When the mixing ratio of the total flake carbon and the coating carbon is within the above range, it is possible to manufacture a lithium battery having excellent discharge capacity and improved capacity retention rate.

The above-described mixing ratio of the total flake carbon and the coating carbon may be confirmed through thermogravimetric analysis. The first carbon is associated with a peak appearing in a range of 700° C. to 750° C., and the second carbon is associated with a peak appearing in a range of 600° C. to 650° C.

Thermogravimetric analysis, for example, is carried out in an air atmosphere in the range of 25° C. to 1,000° C. and at a temperature increase rate of about 10° C./min.

According to an embodiment, the total flake carbon is crystalline carbon, and the coating carbon is amorphous carbon.

A mixing ratio of the total weight of the first carbon flake and the second carbon flake to the total weight of the first amorphous carbon and the second amorphous carbon is 1:99 to 99:1, for example 1:20 to 80:1, for example 1:1 to 1:10.

In the present specification, the term "duster" refers to an aggregate of at least one or more primary particles, and may be interpreted substantially as the same meaning as "secondary particle".

In the present specification, the term "grapheme" may have a structure such as a flake, a nanosheet, or a film. Herein, the nanosheet refers to a case of being formed on the silicon suboxide or the porous silicon secondary particle in an irregular state, and the film refers to a film form continuously and uniformly formed on the silicon suboxide or the porous silicon secondary particle. As such, grapheme may have a separate number of layers or may have a structure without layer division.

In the silicon-containing composite according to an embodiment, the size of the porous silicon secondary particle is 1 μm to 20 μm, for example 2 μm to 18 μm, for example 3 μm to 10 μm, and the size of the carbon flake is 1 nm to 200 nm, for example 5 nm to 150 nm, for example 10 nm to 100 nm. Here, the size refers to a diameter or a major axis length.

The diameter ratio of the porous silicon secondary particle and the silicon-containing composite is 1:1 to 1:30, for example 1:2 to 1:30, for example 1:5 to 1:25, specifically 1:21. The diameter ratio of the porous silicon secondary particle and the porous silicon composite cluster indicates a size ratio thereof when both the porous silicon secondary particle and the silicon-containing composite have a spherical shape. When the porous silicon secondary particle and the silicon-containing composite have a non-spherical shape, the diameter ratio may be a ratio of a major axis length.

The thickness of the carbon coating film of the shell is 1:0.001 to 1:1.67, for example, 1:0.01, 1:1.67, 1:0.0033, or 1:0.5.

The total content of the first carbon flake and the second carbon flake in the silicon-containing composite may be 0.1 to 2,000 parts by weight, for example 0.1 to 300 parts by weight, for example 0.1 to 90 parts by weight, specifically 5 to 30 parts by weight, based on 100 parts by weight of silicon. When the total content of the first carbon flake and the second carbon flake is within the above range, the volume suppression effect of silicon is excellent, and the conductivity properties thereof are excellent.

The first carbon flake and the second carbon flake may be, for example, graphene flakes.

There is provided a silicon-containing structure where, in the silicon composite primary particle, the first carbon flakes are graphene flakes, the graphene flakes are spaced apart from silicon suboxide (SiOx) (O<x<2) by a distance of 10 nm or less, for example 5 nm or less, for example 3 nm or less, for example 1 nm or less, the total thickness of the graphene flakes is 0.3 nm to 1,000 nm, for example 0.3 nm to 50 nm, for example 0.6 nm to 50 nm, for example 1 nm to 30 nm, and the graphene flakes are aligned at an angle of 0° to 90°, for example 10° to 80°, for example 20° to 70°, with respect to the major axis (for example, Y axis) of the silicon. In the present specification, the major axis refers to Y axis. The graphene flake of the silicon composite primary particle is also referred to as a secondary graphene flake.

In the porous silicon secondary particle according to an embodiment, the second carbon flakes are graphene flakes, the graphene flakes are spaced apart from silicon suboxide (SiOx)(O<x<2) by a distance of 1,000 nm or less, for example 500 nm or less, for example 10 nm or less, for example 1 nm or less, for example, 0.00001 nm to 1 nm, for example 0.00001 nm to 0.01 nm, the total thickness of the graphene flakes is 0.3 nm to 1,000 nm, for example 1 nm to 50 nm, and the graphene flakes are aligned at an angle of 0° to 90°, for example 10° to 80°, for example 20° to 70°, with respect to the major axis (for example, Y axis) of the silicon. The major axis of the silicon may indicate the major axis of the porous silicon secondary particle. The graphene flake of the porous silicon secondary particles is referred to as a first graphene flake.

The graphene flake may have at least one or more graphene layers, for example, 1 to 50 graphene layers, for example, 1 to 40 graphene layers, for example, 1 to 30 graphene layers, for example, 1 to 20 graphene layers.

The thickness of the silicon suboxide (SiOx) (O<x<2) disposed on the surface of the silicon is 30 μm or less, for example 10 μm or less, for example 1 μm or less, for example 1 nm to 100 nm, for example 1 nm to 50 nm, for example 1 nm to 20 nm, for example 10 nm. The silicon suboxide may fully or partially cover the surface of the silicon. The coverage rate of the silicon suboxide is, for example, 100%, for example 10% to 100%, for example 10% to 99%, for example 20% to 95%, for example 40% to 90%, based on the total surface area of the silicon.

The shape of the silicon is not particularly limited, and is, for example, a sphere, nanowires, a needle, a rod, a particle, nanotubes, nanorods, a wafer, nanoribbons, or a combination thereof. In addition, the average size of silicon is 10 nm to 30 μm, for example, 10 nm to 1,000 nm, for example, 20 nm to 150 nm, for example, 100 nm. The average size of silicon may be an average particle diameter when the silicon is a spherical particle, and may mean a long axis length, a length, or a thickness when the silicon is a non-spherical particle, for example, a plate-shaped particle or a needle-shaped particle.

The average particle diameter (D50) of the porous silicon secondary particles is 200 nm to 50 for example 1 μm to 30 μm, for example 2 μm to 25 μm, for example 3 μm to 20 μm, for example 1 μm to 15 μm, specifically 7 μm to 11 μm. The particle diameter (D10) of the porous silicon secondary particles is 0.001 μm to 10 μm, for example, 0.005 μm to 5 μm, for example, 0.01 μm to 1 μm. And, the particle diameter (D90) of the porous silicon secondary particles is 10 μm to 60 μm, for example, 12 μm to 28 μm, for example, 14 μm to 26 μm.

In the present specification, D50 represents a particle diameter corresponding to 50% of the particles in a cumulative distribution curve where particles are accumulated in the order of particle diameter from the smallest particle to the largest particle, and the number of accumulated particles is 100%. Similarly, the terms "D10" and "D90" indicate particle diameters corresponding to 10% and 90% of the particles in the cumulative distribution curve of porous silicon secondary particles, respectively.

The specific surface area of the porous silicon secondary particles is 0.1 to 100 $m^2/g$, for example, 1 to 30 $m^2/g$, for example, 1 to 5 $m^2/g$. The density of the porous silicon secondary particles is 0.1 g/cc to 2.8 g/cc, for example 0.1 g/cc to 2.57 g/cc, for example 0.5 g/cc to 2 g/cc.

When a carbon-based coating film is formed on the surface of the silicon-containing structure, a lithium battery having improved lifespan characteristics can be manufactured.

The ratio of the diameter of the silicon-containing composite to the thickness of the carbon-based coating film is 1:1 to 1:50, for example, 1:1 to 1:40, specifically 1:0.0001 to 1:1.

The thickness of the carbon-based coating film is 1 nm to 5,000 nm, for example, 10 nm to 2,000 nm, for example, 5 nm to 2,500 nm.

The carbon-based coating film may have a single-layer structure including amorphous carbon and crystalline carbon. The carbon-based coating film may have a two-layer structure including a first carbon-based coating film containing amorphous carbon and a second carbon-based coating film containing crystalline carbon.

The two-layer structure may be a structure in which a first carbon-based coating film containing amorphous carbon and a second carbon-based coating film containing crystalline carbon are sequentially stacked on the silicon-containing composite or a second carbon-based coating film containing crystalline carbon and a first carbon-based coating film containing amorphous carbon are sequentially stacked on the silicon-containing composite.

The particle size distribution range of the silicon-containing structure is narrow. For example, the average particle diameter (D50) of the porous silicon clusters (secondary particles) is 1 μm to 30 μm, D10 thereof is 0.001 μm to 10 μm, and D90 thereof is 10 μm to 60 μm. As such, the silicon-containing composite according to an embodiment has a narrow particle size distribution. In contrast, silicon composite secondary particles obtained from conventional silicon composite primary particles have an irregular size distribution of the secondary particles, and it is difficult to control the particle size of an anode active material that exhibits optimal cell performance.

Grapheme serves to suppress the crushing and pulverization of particles occurring in conventional silicon particles. A graphene sliding layer serves as a clamping layer to prevent the disintegration of silicon particles. In addition, an alloying reaction between lithium ions and Si proceeds, so that specific capacity is very excellent and a continuous conductive path is provided between the particles.

When the silicon particles swell, the graphene layers slide to each other and slide back to a relaxed position during a delithiation process. This movement is because the van der Waals force is larger than the friction force between the layers.

From the above-described clamping effect of the graphene layer, it may be confirmed that the graphene layer is maintained even after repeated lithiation/delithiation cycles, and thereby the graphene layer serves as a clamping layer to prevent the deinteration of the silicon particles.

The silicon-containing composite according to an embodiment has very good capacity characteristics with a capacity of 600 to 2,000 mAh/cc.

According to another aspect, there is provided a silicon-containing structure including; a silicon-containing composite including porous silicon secondary particles; and a carbon-based coating film disposed on the silicon-containing composite and containing first amorphous carbon, wherein The silicon-containing composite contains second amorphous carbon, the density of the silicon-containing composite is equal to or lower than the density of the carbon-based coating film, the silicon composite secondary particle includes an aggregate of two or more silicon composite primary particles, and the silicon composite primary particle includes i) at least one silicon suboxide selected from silicon suboxide (SiOx) (0<x<2) and ii) heat treatment products of the silicon suboxide (SiOx) (0<x<2) and a first carbon flake on at least one surface of the silicon suboxide and contains a second carbon flake on at least one surface of the porous silicon secondary particle.

There is provided a silicon-containing structure in which the silicon suboxide exists in a state of a film, a matrix, or a combination thereof, and the first carbon flake and the second carbon flake exist in at least one state selected from a film, a particle, and a matrix, respectively.

According to still another aspect, there is provided a silicon-containing structure having the same configuration as the above-described silicon-containing structure except for the carbon-based coating film disposed on the silicon-containing composite and containing the first amorphous carbon.

In the present specification, the "heat treatment product of silicon suboxide (SiOx) (0<x<2)" refers to a product obtained by subjecting SiOx (0<x<2) to heat treatment. Here, the heat treatment may refer to heat treatment for vapor deposition reaction to grow graphene flakes on SiOx (0<x<2). In the vapor deposition reaction, a carbon source gas or a gas mixture including a carbon source gas and a reducing gas may be used as a graphene flake source. The reducing gas may be, for example, hydrogen.

The heat treatment product of SiOx (0<x<2) may be a product obtained by heat-treating SiOx (0<x<2) in a gas mixture atmosphere containing i) a carbon source gas or ii) a carbon source gas and a reducing gas.

The heat treatment product of silicon suboxide (SiOx) (0<x<2) may be, for example, a structure in which silicon (Si) is disposed in a silicon suboxide (SiO$_y$) (0<y≤2) matrix. A heat treatment product of silicon suboxide (SiOx) (0<x<2) according to an embodiment is, for example, i) a structure in which silicon (Si) is disposed in a silicon suboxide (SiO$_2$) matrix, ii) a structure in which silicon (Si) is disposed in a matrix containing SiO$_2$ and SiO$_y$ (0<y<2), or iii) a structure in which silicon (Si) is disposed in a SiOy (0<y<2) matrix. In other words, the thermal reaction product of silicon sub-oxide includes silicon in a matrix containing SiO$_2$, SiOy (0<y<2), or a combination thereof.

The silicon-containing structure according to an embodiment includes silicon and carbon at a ratio of 50:50 to 70:30 based on the total weight of the silicon-containing structure.

For example, the silicon-containing structure includes silicon and a carbon structure, and may include silicon and a carbon structure at a ratio of 55:45 to 70:30, 60:40 to 70:30, 62:38 to 68:32, or 65:35 based on the total weight of the silicon-containing structure. Here, the carbon structure includes a material made of carbon other than graphite, for example, carbon flakes, grapheme, and the like.

The composite anode according to an aspect may include the silicon-containing structure, the first carbon material, the second carbon material, and the conductive material in the following composition based on 100 parts by weight of the total weight of the composite anode:

silicon-containing structure—5 to 20 parts by weight
first carbon material—30 to 70 parts by weight
second carbon material—greater than 30 and 70 parts by weight
conductive material—5 to 10 parts by weight.

According to an embodiment, the composite anode may include 10 to 20 parts by weight of the silicon-containing structure.

According to an embodiment, the composite anode may include 40 to 70 parts by weight of the first carbon material.

According to an embodiment, the composite anode may include 40 to 70 parts by weight of the second carbon material.

When the composite anode includes the silicon-containing structure, the first carbon material, the second carbon material, and the conductive material within the above ranges, the composite anode may have high capacity and long lifespan characteristics.

According to another aspect, there is disclosed a secondary battery including the above-described composite anode. The secondary battery includes, but is not limited to, a lithium secondary battery and a sodium secondary battery, and includes any battery capable of repeatedly providing electricity by charging and discharging.

For example, the secondary battery is a lithium secondary battery including the composite anode, a cathode, and an electrolyte.

The secondary battery may be manufactured by the following method.

First, the above-described composite anode is prepared.

A composite anode for a lithium secondary battery according to another aspect includes an anode current collector; and an anode active material layer disposed on at least one surface of the anode current collector and including a silicon-containing structure, a first carbon material, a second carbon material, and a conductive material.

The composite anode may include a binder between the anode current collector and the anode active material layer or in the anode active material layer. For the binder, refer to that to be described later.

The composite anode and a lithium secondary battery including the same may be manufactured by the following method.

The composite anode includes a silicon-containing structure, a first carbon material, a second carbon material, and a conductive material, and for example, may be manufactured by a method in which the silicon-containing structure, the first carbon material, the second carbon material, and the conductive material are mixed in a solvent to prepare an anode active material composition, and then the anode active material composition is molded into a predetermined shape or is applied to a current collector such as a copper foil.

The binder used in the anode active material composition, which is a component that assists in bonding the anode active material and the conductive material or the like and bonding to the current collector, may be included between the anode current collector and the anode active material layer or in the anode active material layer, and may be added in an amount of 1 to 50 parts by weight based on 100 parts by weight of the anode active material. For example, the binder may be added in an amount of 1 to 30 parts by weight, 1 to 20 parts by weight, or 1 to 15 parts by weight based on 100 parts by weight of the anode active material.

Examples of the binder may include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethersulfone, polyamide, polyacetal, polyphenylene oxide, polybutylene terephthalate, ethylene-propylene-diene terpolymer (EPDM), sulfonated EPDM, styrene butadiene rubber (SBR), fluororubber, and various copolymers.

The composite anode may further include a conductive material to provide a conductive path to the anode active material to further improve electrical conductivity. As the conductive material, any one generally used for lithium batteries may be used, and examples thereof may include carbon-based materials such as carbon black, acetylene black, ketjen black, and carbon fibers (for example, vapor-grown carbon fibers); metal-based materials such as metal powders such as copper, nickel, aluminum, and silver, or metal fibers; and conductive polymers such as polyphenylene derivatives; and mixtures thereof.

As the solvent, N-methylpyrrolidone (NMP), acetone, water, or the like may be used. The content of the solvent is 1 to 10 parts by weight based on 100 parts by weight of the anode active material. When the content of the solvent is within the above range, the operation for forming the active material layer is easy.

In addition, the current collector is generally made to a thickness of 3 μm to 500 μm. The current collector is not particularly limited as long as it has conductivity without causing chemical change in the battery, and for example, a current collector in which the surface of copper, stainless steel, aluminum, nickel, titanium, calcined carbon, copper or stainless steel is treated with carbon, nickel, titanium, silver or the like, or a current collector made of an aluminum-cadmium alloy may be used. In addition, the bonding force of the anode active material may be increased by forming fine irregularities on the surface of the current collector, and the current collector may be used in various forms, such as a film, a sheet, a foil, a net, a porous body, a foam body, and a nonwoven body.

A composite anode plate may be prepared by directly applying the prepared anode active material composition onto the current collector, or a composite anode plate may be obtained by casting the prepared anode active material composition on a separate support; separating an anode active material film from the support and laminating the anode active material film on a copper foil current collector. The composite anode is not limited to the above-mentioned types, and may have a type other than these types.

The anode active material composition may be not only used for manufacturing an electrode of a lithium battery, but also used for manufacturing a printable battery by being printed on a flexible electrode substrate.

Next, a cathode is prepared.

For example, a cathode active material composition in which a cathode active material, a conductive material, a binder, and a solvent are mixed is prepared. A cathode plate is prepared by coating a metal current collector with the cathode active material composition. Alternatively, the cathode plate may be prepared by casting the cathode active material composition onto a separate support, separating a film from the support and then laminating the separated film on a metal current collector. The cathode is not limited to the above-described form, but may have a form other than the above-described form.

The cathode active material; which is a lithium-containing metal oxide, may be used without limitation as long as it is generally used in the art. As the lithium-containing metal oxide, for example, one or more kinds of composite oxides of lithium and a metal selected from cobalt, manganese, nickel, and combinations thereof may be used. For example, a compound represented by any one of Formulae of $Li_aA_{1-b}B^1{}_bD^1{}_2$ (where, $0.90 \leq a \leq 1.8$, and $0 \leq b \leq 0.5$ are satisfied); $Li_aE_{1-b}B^1{}_bO_{2-c}D^1{}_c$ (where, $0.90 \leq a \leq 1.8$, $0 \leq b \leq 0.5$, and $0 \leq c \leq 0.05$ are satisfied); $LiE_{2-b}B^1{}_bO_{4-c}D^1{}_c$ (where, $0 \leq b \leq 0.5$ and $0 \leq c \leq 0.05$ are satisfied); $Li_aNi_{1-b-c}Co_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^1{}_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1_cO_{2-\alpha}F^1_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In Formulas above, A is Ni, Co, Mn, or a combination thereof; $B^1$ is Al, Ni, Co, Mn, Cr, Fe, Mg, Sr, V, a rare earth element, or a combination thereof; $D^1$ is O, F, S, P, or a combination thereof; E is Co Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V Cr. Mn, Co, Ni, Cu, or a combination thereof.

For example, the lithium-containing metal oxide may be $LiCoO_2$, $LiMn_xO_{2x}$ (x=1, 2), $LiNi_{1-x}Mn_xO_{2x}$ ($0 < x < 1$), $LiNi_{1-x-y}Co_xMn_yO_2$ ($0 \leq x \leq 0.5$, $0 \leq y \leq 0.5$), or $LiFePO_4$.

Also, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the Ike). This coating method will be understood by those skilled in the art, so that a detailed description thereof will be omitted.

As the conductive material, for example, carbon black, graphite fine particles, or the like may be used, but is not limited thereto. Any conductive material may be used as long as it may be used in the art.

As the binder, a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber-based polymer may be used. Any binder may be used as long as it may be used in the related techinical field.

As the solvent, N-methylpyrrolidone, acetone, water, or the like may be used, but the present disclosure is not limited thereto. Any solvent may be used as long as it is used in the related technical field.

The content of the cathode active material, the content of the conductive material, the content of the binder, and the content of the solvent are levels commonly used in the lithium secondary battery. At least one of the conductive material, the binder, and the solvent may be omitted depending on the use and configuration of the lithium battery.

Next, a separator to be inserted between the anode and the cathode is prepared.

As the separator, any separator may be used as long as it is commonly used in a lithium battery. A separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium-ion battery, and a separator having good electrolyte impregnation ability may be used in a lithium-ion polymer battery. For example, the separator may be manufactured by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the manufacture of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, an electrolyte is prepared.

For example, the electrolyte may be an organic electrolyte. The electrolyte may be a solid electrolyte. For example, the solid electrolyte may be boron oxide, lithium oxynitride, or the like, but is not limited thereto. Any solid electrolyte may be used as long as it may be used in the art. The solid electrolyte may be formed on the anode by sputtering or the like.

For example, the organic electrolyte may be prepared by dissolving lithium salt in an organic solvent.

As the organic solvent, any organic solvent may be used as long as it may be used in the art. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, Acetonitrile, tetrahydrofuran, 2-methyltetrahydrofuran, γ-butyrolactone, dioxolane, 4-methyldioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, and mixtures thereof.

As the lithium salt, any lithium salt may be used as long as it may be used in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$(here, x and y are natural number), LiCl, LiI, or a mixture thereof.

Figure 7:
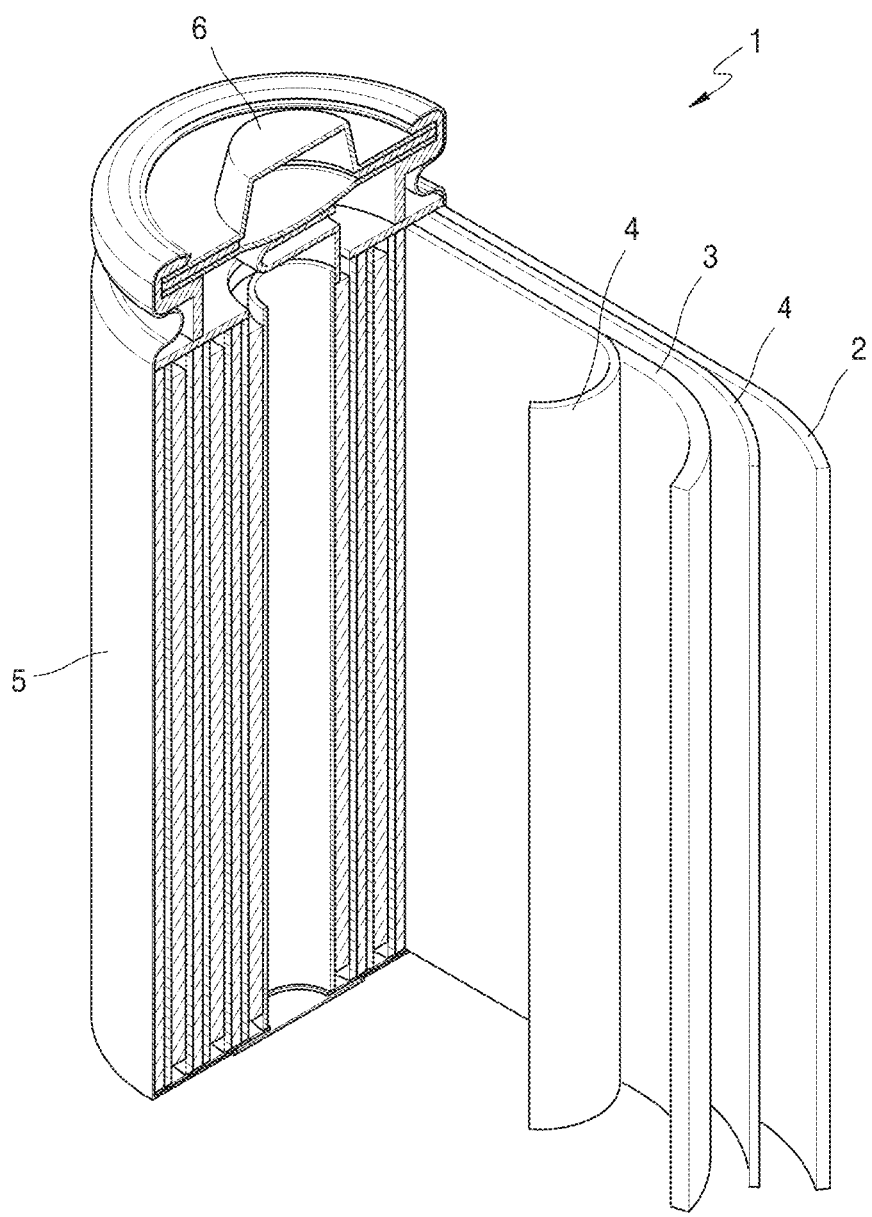
FIG. 7 is a schematic view showing the structure of a lithium secondary battery according to an embodiment.

As shown in FIG. 7, the lithium secondary battery 121 includes a cathode 123, an anode 122, and a separator 124. The cathode 123, the anode 122, and the separator 124 are wound or folded and accommodated in a battery case 125. Then, an organic electrolyte is injected into the battery case 125, and the battery case 125 is sealed with a cap assembly 126 to complete the manufacture of the lithium secondary battery 121. The battery case 125 may have a cylindrical shape, a rectangular shape, or a thin film shape. For example, the lithium secondary battery 121 may be a thin-film battery. The lithium secondary battery 121 may be a lithium-ion battery.

The separator 124 may be located between the cathode 123 and the anode 122 to form a battery structure. The battery structure is laminated as a bi-cell structure and then impregnated with an organic electrolyte, and the resulting product is accommodated in a pouch and sealed to complete a lithium-ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

In addition, the lithium secondary battery may be used in an electric vehicle (EV) because of its excellent life characteristics and high-rate characteristics. For example, the lithium secondary battery may be used in hybrid vehicles such as plug-in hybrid electric vehicles (PHEV). In addition, the lithium secondary battery may be used in applications where a large amount of power storage is required. For example, the lithium secondary battery may be used in electric bicycles, power tools, and the like.

Hereinafter, the present disclosure will be described in more detail with reference to Preparation Examples, Examples, and Comparative Examples. However, these Examples are for illustrating the present disclosure, and the scope of the present disclosure is not limited thereto.

Example 1

(Preparation of Composite Anode)

A silicon-containing composite (purchased from BTR), a first carbon material (purchased from BTR), a second carbon material (purchased from BTR), and Ketjen Black as a conductive material were mixed in a solvent (DIW) at a ratio of 13/41/41/5 by weight, and 2.2 wt % of a binder in which carboxymethyl cellulose (CMC) and styrene-butadiene rubber (SBR) were mixed at a ratio of 1:1.2 by weight was added thereto to obtain an anode active material slurry. Then, the slurry was applied onto a copper current collector using a doctor blade, dried at 110° C., rolled, and then vacuum-dried at 145° C. to obtain a composite anode.

(Manufacture of Half Cell)

A half cell was manufactured by using the above-prepared composite anode as a working electrode, using a lithium metal foil as a counter electrode, placing a separator between the working electrode and the counter electrode, and injecting a liquid electrolyte therebetween. The liquid electrolyte was prepared by adding $LiPF_6$ as a lithium salt to a concentration of 1.5M to a solvent in which EC/EMC/DMC was mixed at a volume ratio of 2/1/7.

Comparative Example 1

(Preparation of Composite Anode)

A silicon-containing composite and a second carbon material were mixed in distilled water (DIW) at a ratio of 14/86 by weight to obtain an anode active material slurry. Then, the slurry was applied onto a copper current collector using a doctor blade, dried, and then rolled to obtain a composite anode.

(Manufacture of Half Cell)

A half cell was manufactured by using the above-prepared composite anode as a working electrode, using a lithium metal foil as a counter electrode, placing a separator between the working electrode and the counter electrode, and injecting a liquid electrolyte therebetween.

Comparative Example 2

A half cell was manufactured in the same manner as in Comparative Example 1, except that a silicon-containing composite, a second carbon material, and a conductive material were used at a ratio of 14/81/5 by weight.

Comparative Example 3

A half cell was manufactured in the same manner as in Comparative Example 1, except that a silicon-containing composite, natural graphite (purchased from BTR), a second carbon material, and a conductive material were used at a ratio of 13/41/41/5 by weight.

Comparative Example 4

A half cell was manufactured in the same manner as in Comparative Example 1, except that a graphite-containing silicon-carbon composite, a second carbon material, and a conductive material were used at a ratio of 18/77/5 by weight.

Comparative Example 5

A half cell was manufactured in the same manner as in Comparative Example 1, except that a graphite-containing silicon-carbon composite, natural graphite, a second carbon material, and a conductive material were used at a ratio of 17/39/39/5 by weight.

Comparative Example 6

A half cell was manufactured in the same manner as in Comparative Example 1, except that a graphite-containing silicon-carbon composite, a first carbon material, a second carbon material, and a conductive material were used at a ratio of 17/39/39/5 by weight.

Evaluation Example 1

The sizes of specific surface areas according to the sizes of particles of the first carbon material, artificial graphite, and natural graphite were measured and shown in FIG. 1 as a trend line graph, and slopes thereof are shown in Table 1 below.

As a result, it was confirmed that the first carbon material shows a small negative slope compared to artificial graphite and natural graphite. Although not limited to theory, it may be found that a decrease in specific surface area value of the first carbon material is small even when the particle size of the carbon material increases due to the small internal pore volume of the first carbon material.

TABLE 1

| Trend line slope | First carbon material | Artificial graphite | Natural graphite |
|---|---|---|---|
| −0.0568 | −0.1000 | −0.0833 | |

Evaluation Example 2

Surface SEM images and cross-sectional SEM images were taken for the first carbon material, artificial graphite and natural graphite, and the particle size (D50), true density, packing density, and specific surface area (BET) and XRD (d002) values of each of the carbon materials were measured.

The SEM images are shown in FIG. 1, and the particle size (D50), true density, packing density, and specific surface area (BET) and XRD (d002) values of each of the carbon materials are given in Table 2 below,

TABLE 2

|  | First carbon material | Artificial graphite | Natural graphite |
|---|---|---|---|
| Particle size (D50) μm | 17.1 | 12.9 | 23.1 |
| True density (TD) g/cc | 1.13 | 1.18 | 1.04 |
| Packing density (PD, 2 ton) g/cc | 1.90 | 1.58 | 2.13 |
| Specific surface area (BET) m²/g | 1.3 | 1.3 | 4.7 |
| XRD(d002) Å | 3.3567 | 3.3594 | 3.3567 |

As given in Table 2 above, the first carbon material has a specific surface area similar to that of artificial graphite, and at the same time has packing density and d002 values similar to those of natural graphite, so that the first carbon material may have both properties of artificial graphite and properties of natural graphite.

Evaluation Example 3

The component content and specific capacity of the graphite-containing silicon-carbon composite and the silicon-containing composite were confirmed, and the particle size (D50), true density (TD), packing density (PD), and specific surface area (BET) of each of the composites were measured, and given in Table 3 below.

TABLE 3

|  |  | Graphite-containing silicon-carbon composite | Silicon-containing composite |
|---|---|---|---|
| Si content (wt %) |  | 40 | 65 |
| Graphite content (wt %) |  | 40 | 0 |
| C content (wt %) |  | 20 | 35 |
| Specific capacity (mAh/g) |  | 1250 | 1500 |
| D50 | μm | 12.6 | 12.6 |
| True density (TD) | g/cc | 0.80 | 0.98 |
| Packing density (PD, 2 ton) | g/cc | 1.41 | 1.12 |
| Specific surface area (BET) | m²/g | 5.5 | 6.9 |

As given in Table 3 above, it may be found that in the porous silicon-containing structure, as a part of graphite in the silicon-containing composite was replaced with Si, the content of Si was increased, and as a result, the specific capacity was increased by about 20%.

Evaluation Example 4

Figure 3:
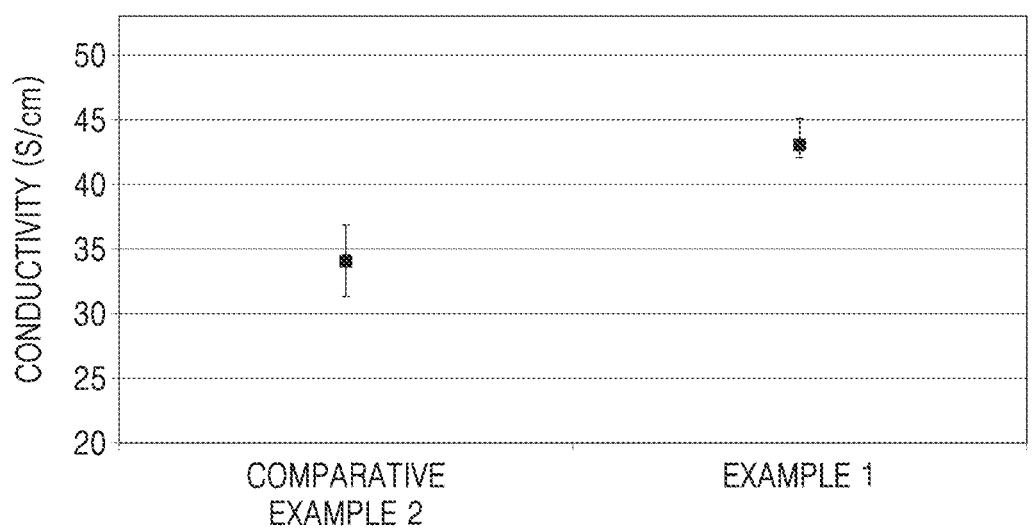
FIG. 3 is a graph showing the measured conductivity of the composite anodes used in Example 1 and Comparative Example 2.

Conductivity was measured for the composite anodes used in Example 1 and Comparative Example 2, and the results thereof are shown in FIG. 3. Referring to FIG. 3, it may be found that like the composite anode used in Example 1, when the first carbon material and the second carbon material are mixed with the anode active material, conductivity is increased by about 25%, compared to when only the second carbon material is used (Comparative Example 2), Accordingly, it may be found that the contactability in the electrode is improved through the addition of the first carbon material.

Evaluation Example 5

The half cells manufactured in Example 1 and Comparative Examples 1 to 6 were charged with a constant current of 0.1 C rate at 25° C. until a voltage reached 4.2 V (vs. Li), and were then cut-off at a current of 0.05 C rate while maintaining the voltage at 4.0 V in a constant voltage mode. Subsequently, the half cells were discharged with a constant current of 0.1 C rate until the voltage reached 2.5V (vs. Li) during discharging to complete a formation process.

The lithium battery having undergone the formation process was charged with a constant current of 0.1 C rate at 25° C. until the voltage reached 4.2 V (vs. Li), and were then cut-off at a current of 0.05 C rate while maintaining the voltage at 4.0 V in a constant voltage mode. Subsequently, the lithium battery was discharged with a constant current of 0.1 C rate until the voltage reached 2.5V (vs. Li) during discharging. This charge-discharge cycle were repeated 700 times.

After one charge/discharge cycle in all the charge/discharge cycles, a 10 minute stop time was provided.

Figure 4:
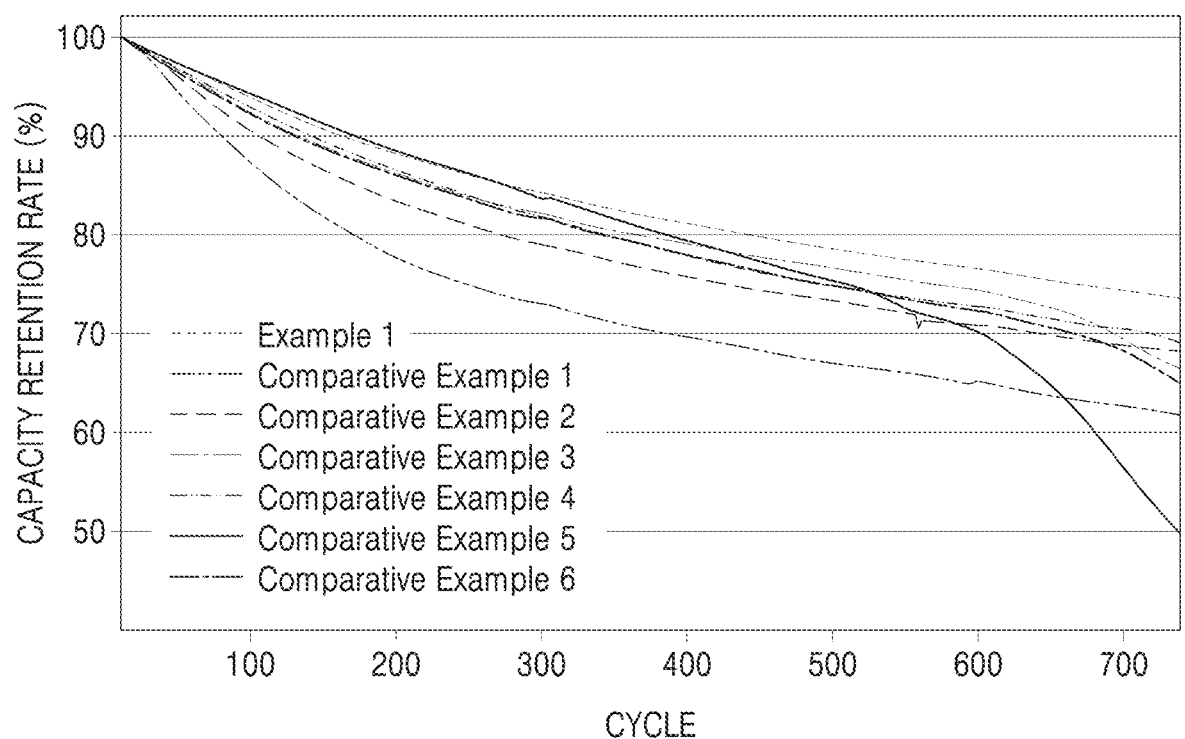
FIG. 4 is a graph showing the lifespan characteristics of the half cells of Example 1 and Comparative Examples 1 to 6.

The results of the charging and discharging experiments are shown in Table 4 below and FIG. 4. The initial efficiency at the 1st cycle and the capacity retention rate at the 700th cycle are defined by Equations 1 and 2 below.

Initial efficiency [%]=[Discharge capacity at 1st cycle/Charge capacity at 1st cycle]×100  <Equation 1>

Capacity retention rate [%]=[Discharge capacity after 700 cycles/Discharge capacity at 1st cycle]×100  <Equation 2>

TABLE 4

|  | Initial efficiency (%) | Capacity retention rate (%) after 700 cycles |
|---|---|---|
| Example 1 | 90.5 | 87.5 |
| Comparative Example 1 | 90.5 | 81.8 |
| Comparative Example 2 | 90.4 | 84.0 |
| Comparative Example 3 | 89.5 | 84.5 |
| Comparative Example 4 | 89.5 | 85.2 |
| Comparative Example 5 | 88.5 | 78.0 |
| Comparative Example 6 | 89.5 | 83.8 |

As given in Table 4, when the lithium battery incudes the first carbon material, the initial efficiency was higher than that of each of the lithium batteries of Comparative Examples 3 to 5 including natural graphite. In addition, it may be found that the lithium battery of Example 1 including both the first carbon material and the second carbon material exhibits the same level of initial efficiency as the lithium batteries of Comparative Examples 1 and 6, but the capacity retention rate thereof is lowered as the lithium battery goes through the charge-discharge cycle. Through this, it may be found that the first carbon material exhibits an excellent effect in improving the lifespan characteristics of the lithium battery. In addition, it may be found that the initial capacity of Comparative Example 6 including the graphite-containing silicon-carbon composite instead of the silicon-containing composite is lowered than that of the composite anode of the present disclosure (Example 1), and the capacity retention rate thereof is lower than that of the composite anode of the present disclosure (Example 1), Based on these data, it may be found that the present disclosure has high capacity and improved lifespan characteristics when the silicon-containing composite, the first carbon material, and the second carbon material are mixed.

As described above, the embodiments disclosed in the present disclosure are not intended to limit the technical spirit of the present disclosure, but intended to explain the technical spirit of the present disclosure, and the protection scope of the present invention should be interpreted by the following claims, and all technical ideas within the equivalent range should be construed as being included in the scope of the present disclosure.

The invention claimed is:

1. A composite anode comprising:
   a silicon-containing structure;
   a first carbon material;
   a second carbon material; and
   a conductive material; wherein:
   the first carbon material has a specific surface area (BET) value of 1.5 m$^2$/g or less, a rate of change of the specific surface area (m$^2$/g) to an increase in particle size (μm) is −0.07 to −0.04 m$^2$/μm·g, and an area occupied by pores in a cross-section of the first carbon material is 10% or less.

2. The composite anode of claim 1, wherein the first carbon material has a packing density of 1.7 g/cc or more.

3. The composite anode of claim 1, wherein in an XRD measurement of the first carbon material, an interplanar distance d002 of (002) plane is 3.356 Å to 3.357 Å.

4. The composite anode of claim 1, wherein the silicon-containing structure is graphite-free.

5. The composite anode of claim 1, wherein
   the silicon-containing structure comprises a silicon-containing composite including a porous silicon secondary particle; and a carbon-based coating film disposed on the silicon-containing composite and including a first amorphous carbon,
   the silicon-containing composite includes a second amorphous carbon such that density of the silicon-containing composite is equal to or lower than density of the carbon-based coating film,
   the porous silicon secondary particle includes an aggregate of two or more silicon composite primary particles,
   the silicon composite primary particle includes silicon; and silicon suboxide (SiOx) (0<x<2) on at least one surface of the silicon and a first carbon flake on at least one surface of the silicon suboxide, and
   includes a second carbon flake on at least one surface of the porous silicon secondary particles.

6. The composite anode of claim 5, wherein the silicon-containing composite has a porosity of 60% or less.

7. The composite anode of claim 1, wherein in the silicon-containing structure, a content of silicon exceeds 40 wt % based on a total weight of the silicon-containing structure.

8. The composite anode of claim 1, wherein
   the silicon-containing structure includes silicon and a carbon structure, and
   includes silicon and a carbon structure at a ratio of 50:50 to 70:30 based on a total weight of the silicon-containing structure.

9. The composite anode of claim 1, wherein in the second carbon material, a rate of a change of the specific surface area (m$^2$/g) to an increase in particle size (μm) is −0.08 to −0.12 m$^2$/μm·g.

10. The composite anode of claim 1, wherein packing density of the first carbon material is higher than packing density of the second carbon material.

11. The composite anode of claim 1, wherein the conductive material includes at least one of graphite particulate, acetylene black, carbon black, and ketjen black.

12. The composite anode of claim 1, wherein the composite anode includes the silicon-containing structure, the first carbon material, the second carbon material and the conductive material by composition ratios below, based on 100 parts by weight of a total weight of the composite anode:
   silicon-containing structure-5 to 20 parts by weight
   first carbon material-30 to 70 parts by weight
   second carbon material-30 to 70 parts by weight
   conductive material-5 to 10 parts by weight.

13. A lithium secondary battery comprising:
   the composite anode of claim 1;
   a cathode; and
   an electrolyte.

* * * * *